United States Patent
Sridharan

(10) Patent No.: US 10,191,817 B2
(45) Date of Patent: Jan. 29, 2019

(54) SYSTEMS AND METHODS FOR BACKING UP LARGE DISTRIBUTED SCALE-OUT DATA SYSTEMS

(71) Applicant: Veritas Technologies LLC, Mountain View, CA (US)

(72) Inventor: Srineet Sridharan, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 357 days.

(21) Appl. No.: 14/979,635

(22) Filed: Dec. 28, 2015

(65) Prior Publication Data

US 2017/0185490 A1 Jun. 29, 2017

(51) Int. Cl.
*G06F 17/30* (2006.01)
*G06F 11/14* (2006.01)
*G06F 3/06* (2006.01)

(52) U.S. Cl.
CPC ........ *G06F 11/1464* (2013.01); *G06F 3/0604* (2013.01); *G06F 3/067* (2013.01); *G06F 3/0653* (2013.01); *G06F 3/065* (2013.01); *G06F 3/0623* (2013.01)

(58) Field of Classification Search
CPC .................................................. G06F 11/1464
See application file for complete search history.

(56) References Cited

U.S. PATENT DOCUMENTS

| | | | |
|---|---|---|---|
| 8,244,998 B1 | 8/2012 | Krinke | |
| 2006/0271601 A1* | 11/2006 | Fatula, Jr. | G06F 11/1464 |
| 2007/0005914 A1* | 1/2007 | Thompson | G06F 11/1451 |
| | | | 711/162 |
| 2007/0214196 A1 | 9/2007 | Garimella et al. | |
| 2014/0229695 A1 | 8/2014 | Dinkar et al. | |
| 2015/0169718 A1* | 6/2015 | Lee | G06F 17/30088 |
| | | | 707/613 |

OTHER PUBLICATIONS

Theodore J. Kaiser, IV, et al; Systems and Methods for Providing Backup Storage Interfaces; U.S. Appl. No. 13/314,557, filed Dec. 8, 2011.

* cited by examiner

*Primary Examiner* — Syed H Hasan
(74) *Attorney, Agent, or Firm* — FisherBroyles LLP

(57) ABSTRACT

A computer-implemented method for backing up large distributed scale-out data systems may include (1) identifying a backup job to be performed on a distributed scale-out storage system that presents a unified storage view, (2) determining, in response to the backup job applying to distributed scale-out storage and based on a scope of the backup job, a number of backup systems to deploy for performing the backup job, (3) deploying a plurality of backup systems creating a plurality of backups covering the plurality of data objects by (i) assigning, to each backup system, a subset of data objects within the backup job and (ii) backing up, by the backup system, the subset of data objects assigned to the backup system, and (4) combining the plurality of backups into a unified backup that represents the unified storage view. Various other methods, systems, and computer-readable media are also disclosed.

20 Claims, 8 Drawing Sheets

SYSTEMS AND METHODS FOR BACKING UP LARGE DISTRIBUTED SCALE-OUT DATA SYSTEMS

BACKGROUND

In the digital age, organizations increasingly rely on digitally-stored data. As the reliance on digitally-stored data increases, organizations increasingly seek flexible and affordable storage solutions. To this end, some organizations may store data on distributed scale-out storage systems. Distributed scale-out storage systems may allow administrators to add new storage devices to a storage backend while providing a unified view of storage (e.g., exposing a single named data repository), thereby facilitating the scalable expansion of storage and potentially minimizing configuration tasks.

To protect against data loss, an organization may use a backup system to back up important data. However, traditional backup systems may perform poorly when backing up data stored on distributed scale-out storage systems. For example, traditional backup systems may take too long backing up large data sets stored on distributed scale-out storage systems and/or may require large amounts of expensive hardware for performing the backup.

Accordingly, the instant disclosure identifies and addresses a need for additional and improved systems and methods for backing up large distributed scale-out data systems.

SUMMARY

As will be described in greater detail below, the instant disclosure generally relates to systems and methods for backing up large distributed scale-out data systems by dynamically provisioning backup systems for a backup job that apply to distributed scale-out storage systems based on the size of the backup job, dividing the backup job into several smaller backup tasks assigned to the provisioned backup systems, performing the smaller backup tasks (e.g., by the provisioned backup systems, in parallel), and combining the results of the smaller backup tasks into a unified backup (e.g., reflecting a unified storage view provided by the distributed scale-out data system). In addition, in some examples these systems and methods may divide the backup job based on information about the underlying storage architecture of the distributed scale-out data system (rather than, e.g., relying on the unified storage view provided by the distributed scale-out data system).

In one example, a computer-implemented method for backing up large distributed scale-out data systems may include (1) identifying a backup job to be performed on a distributed scale-out storage system that presents a unified storage view, the backup job including a group of data objects, (2) determining, in response to the backup job applying to distributed scale-out storage and based on a scope of the backup job, a number of backup systems to deploy for performing the backup job, (3) deploying a group of backup systems based on the determined number of backup systems and creating a group of backups covering the data objects by, for each backup system within the backup systems, (i) assigning, to the backup system, a subset of the data objects within the backup job to back up and (ii) backing up, by the backup system, the subset of the data objects assigned to the backup system, and (4) combining the backups into a unified backup that represents the unified storage view of the distributed scale-out storage system.

In some examples, creating the backups may include creating the backups in parallel.

In one embodiment, assigning, to the backup system, the subset of the data objects within the backup job to back up may include determining a number of data objects to include in the subset of the data objects based on a target proportion of data objects to assign to the backup system.

In one embodiment, assigning, to the backup system, the subset of the data objects within the backup job to back up may include: determining that a group of data objects are stored together on a single storage node in the distributed scale-out storage system and including the group of data objects in the subset of the data objects assigned to the backup system based on the group of data objects being stored together on the single storage node in the distributed scale-out storage system.

In some examples, determining that the group of data objects are stored together on the single storage node in the distributed scale-out storage system may include determining the storage location of each data object within the group of data objects within a view of a distributed architecture of the distributed scale-out storage system rather than determining the storage location of each data object within the group of data objects within the unified storage view.

In some examples, combining the backups into the unified backup that represents the unified storage view of the distributed scale-out storage system may include: backing up metadata that describes at least one relation between two data objects stored in separate backups within the backups and reconstituting the relation between the two data objects in the unified backup.

In some examples, deploying the backup systems based on the determined number of backup systems may include dynamically initiating the backup systems from a pool of computing resources.

In some examples, creating the backups may include: instructing the distributed scale-out storage system to take a snapshot that includes the data objects and creating the backups from the snapshot.

In some examples, creating the backups may include: instructing the distributed scale-out storage system to take a group of snapshots, each snapshot corresponding to a consistency group of data objects that is configured for point-in-time consistency among data objects within the consistency group and creating the backups from the snapshots.

In one embodiment, determining, in response to the backup job applying to distributed scale-out storage, the number of backup systems to deploy for performing the backup job may include dynamically assessing an amount of computing resources to apply to the backup job rather than assigning a static set of computing resources to apply to the backup job in response to determining that the distributed scale-out storage system represents distributed scale-out storage.

In one embodiment, a system for implementing the above-described method may include (1) an identification module, stored in memory, that identifies a backup job to be performed on a distributed scale-out storage system that presents a unified storage view, the backup job including a group of data objects, (2) a determination module, stored in memory, that determines, in response to the backup job applying to distributed scale-out storage and based on a scope of the backup job, a number of backup systems to deploy for performing the backup job, (3) a deployment module, stored in memory, that deploys a group of backup systems based on the determined number of backup systems and create a group of backups covering the data objects by, for each backup system within the backup systems, (i) assigning, to the backup system, a subset of the data objects within the backup job to back up and (ii) backing up, by the backup system, the subset of the data objects assigned to the backup system, (4) a combination module, stored in memory, that combines the backups into a unified backup that represents the unified storage view of the distributed scale-out storage system, and (5) at least one physical processor configured to execute the identification module, the determination module, the deployment module, and the combination module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a backup job to be performed on a distributed scale-out storage system that presents a unified storage view, the backup job including a group of data objects, (2) determine, in response to the backup job applying to distributed scale-out storage and based on a scope of the backup job, a number of backup systems to deploy for performing the backup job, (3) deploy a group of backup systems based on the determined number of backup systems and creating a group of backups covering the data objects by, for each backup system within the backup systems, (i) assigning, to the backup system, a subset of the data objects within the backup job to back up and (ii) backing up, by the backup system, the subset of the data objects assigned to the backup system, and (4) combine the backups into a unified backup that represents the unified storage view of the distributed scale-out storage system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
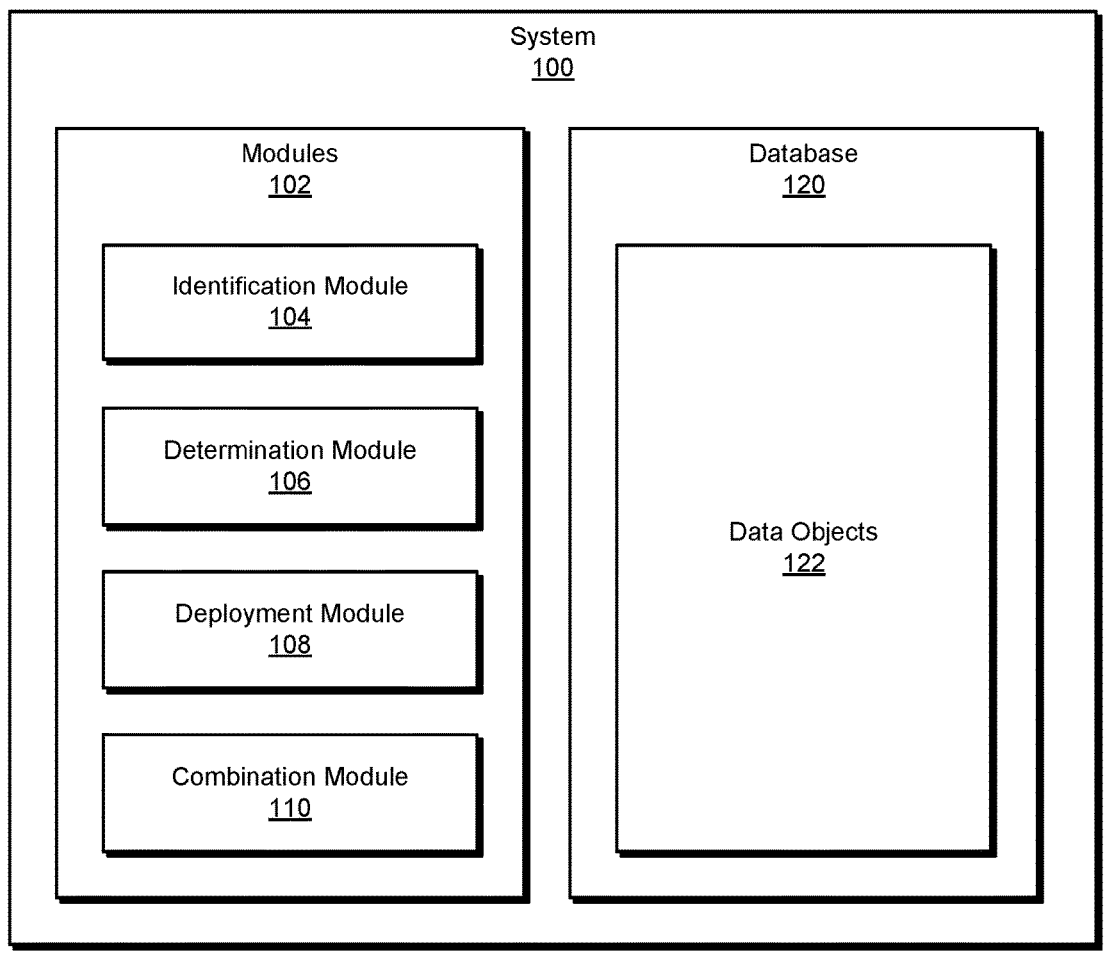
FIG. 1 is a block diagram of an exemplary system for backing up large distributed scale-out data systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for backing up large distributed scale-out data systems. As will be explained in greater detail below, by dynamically provisioning backup systems for a backup job that apply to distributed scale-out storage systems based on the size of the backup job, dividing the backup job into several smaller backup tasks assigned to the provisioned backup systems, performing the smaller backup tasks (e.g., by the provisioned backup systems, in parallel), and combining the results of the smaller backup tasks into a unified backup (e.g., reflecting a unified storage view provided by the distributed scale-out data system), the systems and methods described herein may flexibly provide computing resources for backup jobs on an as-needed basis in a manner responsive to changing storage configurations of facially fixed storage systems. In addition, in some examples, by dividing the backup job based on information about the underlying storage architecture of the distributed scale-out data system (rather than, e.g., relying on the unified storage view provided by the distributed scale-out data system), these systems and methods may improve backup performance.

The following will provide, with reference to FIGS. 1, 2, 4, and 6 detailed descriptions of exemplary systems for backing up large distributed scale-out data systems. Detailed descriptions of corresponding computer-implemented methods will also be provided in connection with FIG. 3. Additionally, detailed descriptions of an exemplary data storage view will be provided with respect to FIG. 5. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for backing up large distributed scale-out data systems. As illustrated in this figure, exemplary system 100 may include one or more modules 102 for performing one or more tasks. For example, and as will be explained in greater detail below, exemplary system 100 may include an identification module 104 that identifies a backup job to be performed on a distributed scale-out storage system that presents a unified storage view, the backup job that includes a plurality of data objects. Exemplary system 100 may additionally include a determination module 106 that determines, in response to the backup job applying to distributed scale-out storage and based on a scope of the backup job, a number of backup systems to deploy for performing the backup job. Exemplary system 100 may also include a deployment module 108 that deploys a plurality of backup systems based on the determined number of backup systems and create a plurality of backups covering the plurality of data objects by, for each backup system within the plurality of backup systems, (1) assigning, to the backup system, a subset of the plurality of data objects within the backup job to back up and (2) backing up, by the backup system, the subset of the plurality of data objects assigned to the backup system. Exemplary system 100 may additionally include a combination module 110 that combines the plurality of backups into a unified backup that represents the unified storage view of the distributed scale-out storage system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or distributed scale-out storage system 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store data objects 122.

Database 120 may represent portions of a single database or computing device or a plurality of databases or computing devices. For example, database 120 may represent a portion of distributed scale-out storage system 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as distributed scale-out storage system 206 in FIG. 2, computing system 710 in FIG. 7, and/or portions of exemplary network architecture 800 in FIG. 8. In one example, database 120 may represent a backup data repository.

Figure 2:
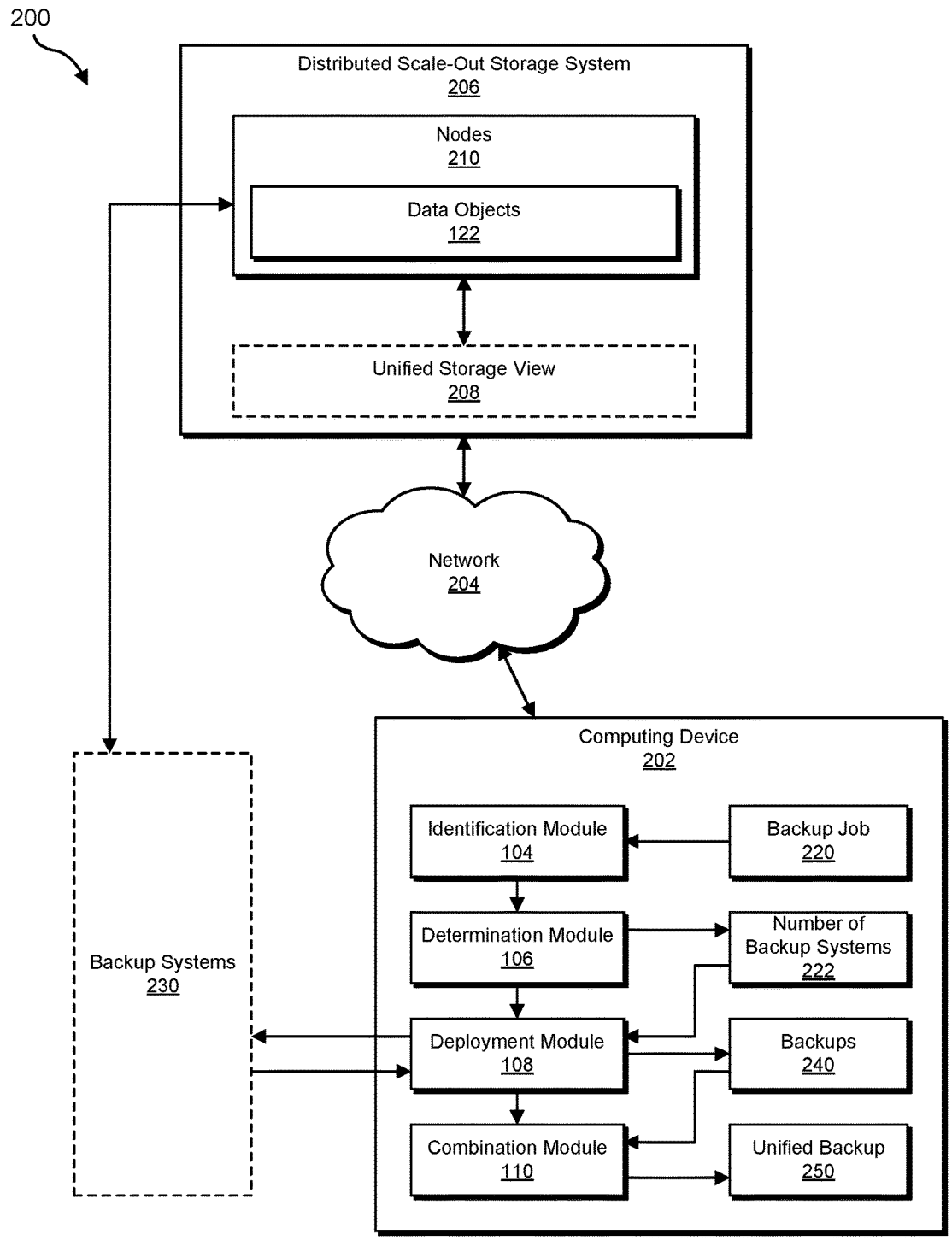
FIG. 2 is a block diagram of an additional exemplary system for backing up large distributed scale-out data systems.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a distributed scale-out storage system 206 via a network 204. In one example, computing device 202 may be programmed with one or more of modules 102 and/or may store all or a portion of the data in database 120. Additionally or alternatively, distributed scale-out storage system 206 may be programmed with one or more of modules 102 and/or may store all or a portion of the data in database 120.

In one embodiment, one or more of modules 102 from FIG. 1 may, when executed by at least one processor of computing device 202 and/or distributed scale-out storage system 206, enable computing device 202 and/or distributed scale-out storage system 206 to back up large distributed scale-out data systems. For example, and as will be described in greater detail below, one or more of modules 102 may cause computing device 202 and/or distributed scale-out storage system 206 to back up data objects 122 stored by distributed scale-out storage system 206. For example, and as will be described in greater detail below, identification module 104 may identify a backup job 220 to be performed on distributed scale-out storage system 206 that presents a unified storage view 208, backup job 220 comprising data objects 122. Determination module 106 may determine, in response to backup job 220 applying to distributed scale-out storage and based on a scope of backup job 220, a number of backup systems 222 to deploy for performing backup job 220. Deployment module 108 may deploy backup systems 230 based on the determined number of backup systems 222 and create backups 240 covering plurality of data objects 122 by, for each system within plurality of backup systems 230, (1) assigning, to the backup system, a subset of data objects 122 within backup job 220 to back up and (2) backing up, by the backup system, the subset data objects 122 assigned to the backup system. Combination module 110 may combine backups 240 into a unified backup 250 that represents unified storage view 208 of distributed scale-out storage system 206.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Distributed scale-out storage system 206 generally represents any type or form of computing system that is capable of storing data and/or providing one or more interfaces to stored data. Examples of distributed scale-out storage system 206 include, without limitation, storage devices and/or computing nodes for performing storage operations.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and distributed scale-out storage system 206.

Figure 3:
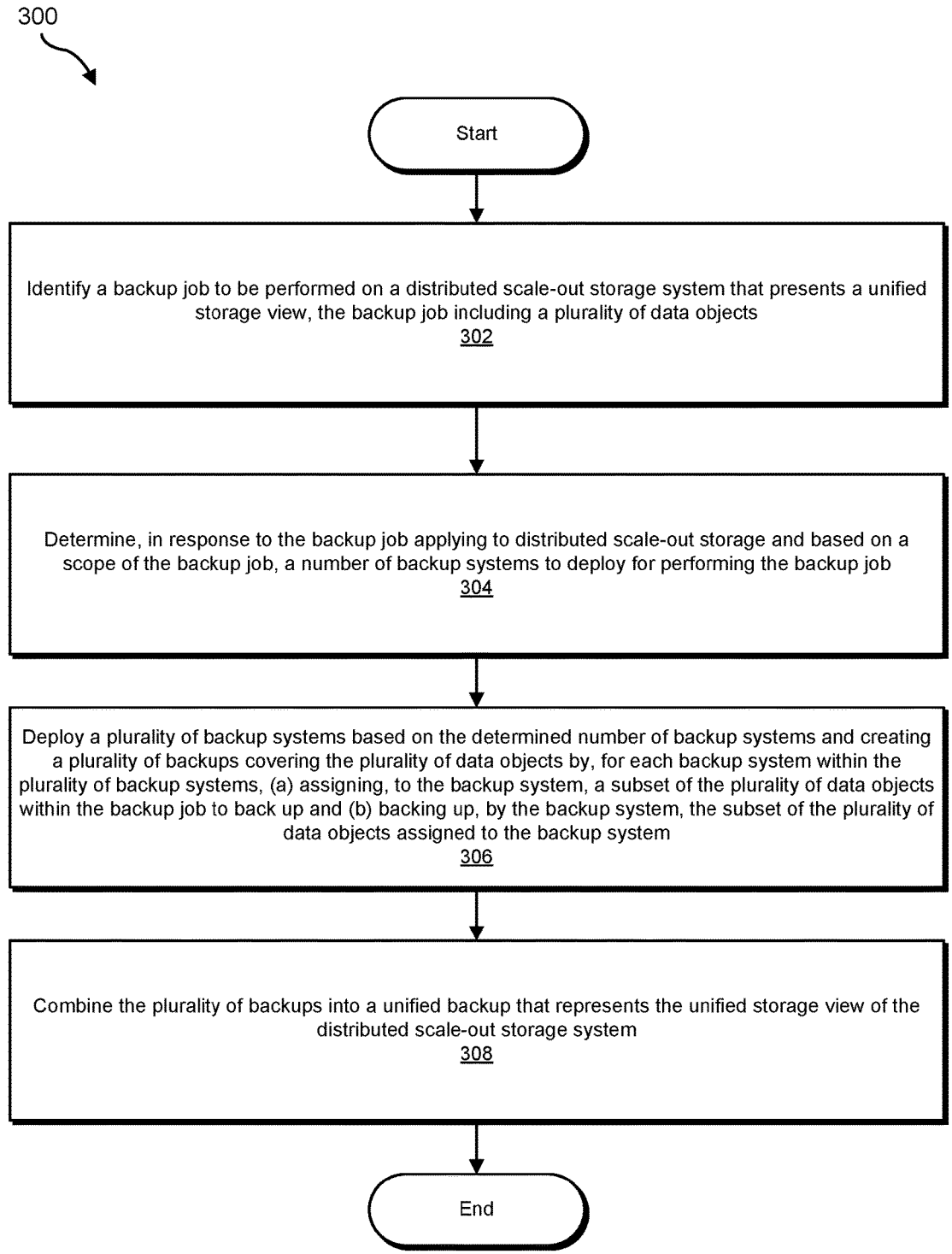
FIG. 3 is a flow diagram of an exemplary method for backing up large distributed scale-out data systems.

FIG. 3 is a flow diagram of an exemplary computer-implemented method 300 for backing up large distributed scale-out data systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302, one or more of the systems described herein may identify a backup job to be performed on a distributed scale-out storage system that presents a unified storage view, the backup job including a plurality of data objects. For example, identification module 104 may, as part of computing device 202 in FIG. 2, identify backup job 220 to be performed on distributed scale-out storage system 206 that presents unified storage view 208, backup job 220 including plurality of data objects 122.

As used herein, the term "backup job" may refer to any configuration, script, and/or specification for performing one or more backup operations. In some examples, a backup job may directly and/or indirectly specify data objects to be backed up, a schedule according to which to back up data objects, and/or one or more conditions under which data objects are to be backed up. In various examples, the backup job may include a full backup (e.g., of a unified storage view supplied by the distributed scale-out storage system), a selected backup, a differential backup, and/or an incremental backup. As used herein, the term "backup operation" may include any operation for backing up, protecting, transferring, and/or replicating data.

As used herein, the term "distributed scale-out storage system" may refer to any storage system that may be scaled out (e.g., by adding one or more computing nodes and/or storage devices to the storage system). As used herein, the term "node" may refer to any computing element that may be added to a distributed scale-out storage system to further scale out the storage system. For example, the term "node" may refer to a computing node (e.g., that facilitates storage operations) and/or to a storage device. The unified storage view may include a logical, virtual, and/or aggregated view of data stored by the distributed scale-out storage system. For example, although the distributed scale-out storage system may include multiple computing nodes and/or storage devices, the distributed scale-out storage system may expose a single data repository representing the multiple computing nodes and/or storage devices. In some examples, the data repository exposed by may seamlessly provide a view of data objects stored by computing nodes and/or storage devices newly added to the distributed scale-out storage system. In some examples, the unified storage view may abstract away individual storage devices and/or computing nodes within the distributed scale-out storage system and/or may not provide the underlying storage location of data objects (e.g., corresponding to one or more computing nodes and/or storage devices). In some examples, the unified storage view may include metadata describing the data objects and/or defining relations between the data objects. In some examples, the metadata provided via the unified storage view may be stored separately by the distributed scale-out storage system and/or may not be stored as a part of the data objects. Accordingly, a copy of a data object (e.g., a backup copy) may lack metadata provided via the unified storage view.

As used herein, the term "data object" may refer to any item of data that is capable of storage by a storage system. Examples of data objects may include, without limitation, file system objects (e.g., files), databases, and database entries.

Identification module 104 may identify the backup job in any of a variety of contexts. For example, identification module 104 may identify a backup job that is configured to back up data objects stored on a distributed scale-out storage system. In some examples, identification module 104 may identify a backup job that is configured to back up data as presented by a unified storage view. For example, the backup job may specify a logical data repository presented by the unified storage view and/or the logical storage location of one or more data objects as presented by the unified storage view (e.g., as opposed to specifying one or more computing nodes and/or storage devices that store data for the distributed scale-out storage system and/or the storage locations of one or more data objects on the computing nodes and/or storage devices).

In some examples, identification module 104 may determine that the backup job applies to a distributed scale-out storage system. For example, the backup job may be configured to specify the data repository presented by the unified storage view of the distributed scale-out storage system as corresponding to a distributed scale-out storage system. Additionally or alternatively, identification module 104 may analyze the distributed scale-out storage system to determine that the distributed scale-out storage system is a distributed scale-out storage system. For example, identification module 104 may retrieve product information about the distributed scale-out storage system indicating that the distributed scale-out storage system is a distributed scale-out storage system, may query the distributed scale-out storage system for information indicating that the distributed scale-out storage system is a distributed scale-out storage system, and/or may identify patterns of behavior by the distributed scale-out storage system that indicate that the distributed scale-out storage system is a distributed scale-out storage system. In some examples, as will be explained in greater detail below, one or more of the systems described herein may perform one or more of the steps described herein in response to determining that the backup job applies to a distributed scale-out storage system.

Returning to FIG. 3, at step 304, one or more of the systems described herein may determine, in response to the backup job applying to distributed scale-out storage and based on a scope of the backup job, a number of backup systems to deploy for performing the backup job. For example, determination module 106 may, as part of computing device 202 in FIG. 2, determine, in response to backup job 220 applying to distributed scale-out storage and based on a scope of backup job 220, the number of backup systems 222 to deploy for performing backup job 220.

As used herein, the term "backup system" may refer to any system, server, workload, and/or process that may be used to back up data. In some examples, a backup system may include a system executing within a dynamically provisioned virtual machine.

Determination module 106 may determine the number of backup systems to deploy in any suitable manner. For example, determination module 106 may determine a target task size (e.g., amount of data to back up) for each backup system and determine how many backup systems would cover the backup job given the target task size. Additionally or alternatively, determination module 106 may determine the number of backup systems by deploying backup systems for the backup job until all portions of the backup job are covered. In some examples, determination module 106 may determine the number of backup systems by identifying a service level objective (e.g., in terms of time until the backup job is completed) and estimating a number of backup systems sufficient for meeting the service level objective (e.g., under the assumption that the backup systems operate in parallel).

In some examples, determination module 106 may dynamically assess an amount of computing resources to apply to the backup job rather than assigning a static set of computing resources to apply to the backup job in response to determining that the distributed scale-out storage system represents distributed scale-out storage. For example, determination module 106 may determine how many backup systems to deploy (rather than, e.g., using a pre-defined set of backup resources) based on determining that the distributed scale-out storage system is a scalable system.

Returning to FIG. 3, at step 306, one or more of the systems described herein may deploy a plurality of backup systems based on the determined number of backup systems and create a plurality of backups covering the plurality of data objects by, for each backup system within the plurality of backup systems, (1) assigning, to the backup system, a subset of the plurality of data objects within the backup job to back up and (2) backing up, by the backup system, the subset of the plurality of data objects assigned to the backup system. For example, deployment module 108 may, as part of computing device 202 in FIG. 2, deploy backup systems 230 based on the determined number of backup systems 222 and create backups 240 covering data objects 122 by, for each backup system within backup systems 230, (1) assigning, to the backup system, a subset of data objects 122 within backup job 220 to back up and (2) backing up, by the backup system, the subset of data objects 122 assigned to the backup system.

Deployment module 108 may create the plurality of backups in any suitable manner. For example, deployment module 108 may deploy the backup systems in parallel and/or instruct the backup systems to create the plurality of backups in parallel. For example, deployment module 108 may deploy the backup systems at a scheduled time and the backup systems may create the backups as they are deployed. Thus, in some examples, one or more of the backup systems may perform backup operations with overlapping time windows. In some examples, deployment module 108 may begin to deploy the backup systems before a scheduled backup time (e.g., specified by the backup job) such that the backup systems are ready to perform the backups at the scheduled backup time.

Deployment module 108 may assign, to each backup system, the corresponding subset of the plurality of data objects in any suitable manner. For example, deployment module 108 may assign each subset to a corresponding backup system by determining a number of data objects to include in the subset based on a target proportion of data objects to assign to the backup system. Additionally or alternatively, deployment 108 may assign each subset to a corresponding backup system by determining a total data amount to include in the subset based on a target proportion of data to assign to the backup system. Accordingly, in some examples, deployment module 108 may assign roughly the same amount of data for backing up to each backup system (subject to, e.g., one or more additional assignment constraints). In some examples, deployment module 108 may assign data objects to backup systems with a differential range that falls below a predetermined threshold.

In some examples, deployment module 108 may assign subsets of data objects to backup systems for backing up based on how and/or where the data objects are stored by the distributed scale-out storage system. For example, deployment module 108 may determine that a group of data objects are stored together on a single storage node (e.g., by a single computing node and/or at a single storage device) in the distributed scale-out storage system and include the group of data objects in a subset to be assigned to a single backup system based on the group of data objects being stored together on the single storage node in the distributed scale-out storage system. In some examples, one or more storage nodes may be assigned to each backup system for backup, but backup operations for a single storage node may not be split among multiple backup systems. In some examples, as explained earlier, multiple storage nodes may be assigned to a backup system based on an amount of data within the multiple storage nodes (e.g., such that each backup system backs up approximately the same amount of data) and/or an estimated amount of time to back up the data within the multiple storage nodes (e.g., such that each backup system spends approximately the same amount of time backing up data). In some examples, multiple storage nodes may be assigned to a backup system based on a relationship between the multiple storage nodes. For example, multiple storage nodes may be assigned to the same backup system based on the multiple storage nodes being located in logical proximity to each other (e.g., based on having a low number of hops between each other, such as being located on the same rack). In some examples, data objects may be assigned to a backup system for backup based at least in part on the consistency group to which the data object belongs (e.g., data objects belonging to a given consistency group may be assigned to a given backup system and/or group of backup systems).

Deployment module 108 may determine that the group of data objects are stored together (e.g., by a single computing node and/or on a single storage device) in the distributed scale-out storage system in any of a variety of ways. For example, deployment module 108 may determine the storage location of each data object within the group of data objects within a view of a distributed architecture of the distributed scale-out storage system rather than determining the storage location of each data object within the group of data objects within the unified storage view. Deployment module 108 may determine the storage location of each data object in any suitable manner. For example, deployment module 108 may query the distributed scale-out storage system for underlying storage locations of data objects identified within the unified storage view. Additionally or alternatively, deployment module 108 may analyze the architecture of and/or metadata maintained by the distributed scale-out storage system to determine the underlying storage locations of data objects. In some examples, deployment module 108 may separately maintain a list of underlying storage locations of data objects (by, e.g., monitoring the activities of the distributed scale-out storage system) and/or may access such a list maintained by another system.

In some examples, deployment module 108 may deploy the plurality of backup systems by dynamically initiating the plurality of backup systems from a pool of computing resources. For example, deployment module 108 may provision multiple virtual machines as backup systems. Additionally or alternatively, deployment module 108 may deploy multiple cloud-based workloads as backup systems. In some examples, deployment module 108 may deploy the backup systems within containers (e.g., container-based virtual environments). In some examples, deployment module 108 may activate backup system agents previously installed on physical devices.

In some examples, the backup systems may back up the data objects from one or more snapshots. For example, deployment module 108 may instruct the distributed scale-out storage system to take a snapshot that includes the plurality of data objects. The backup systems may then back up the plurality of data objects from the snapshot. Additionally or alternatively, deployment module 108 may instruct the distributed scale-out storage system to take a plurality of snapshots, each snapshot corresponding to a consistency group of data objects that is configured for point-in-time consistency among data objects within the consistency group. In this example, the backup systems may then back up the plurality of data objects from the respective snapshots. Deployment module 108 and/or the distributed scale-out storage system may identify the consistency groups in any suitable manner. For example, deployment module 108 may identify data objects pertaining to a single application as belonging to a consistency group. Additionally or alternatively, deployment module 108 may identify data objects pertaining to related applications (e.g., applications in communication with each other and/or that are effected by the input and/or output of each other) as belonging to a consistency group. In some examples, deployment module 108 may identify user-defined consistency groups. In some examples, data objects stored on at the same underlying storage (e.g., at the same storage device and/or by the same storage node) location within the distributed scale-out storage system may be assigned into the same consistency group.

Figure 4:
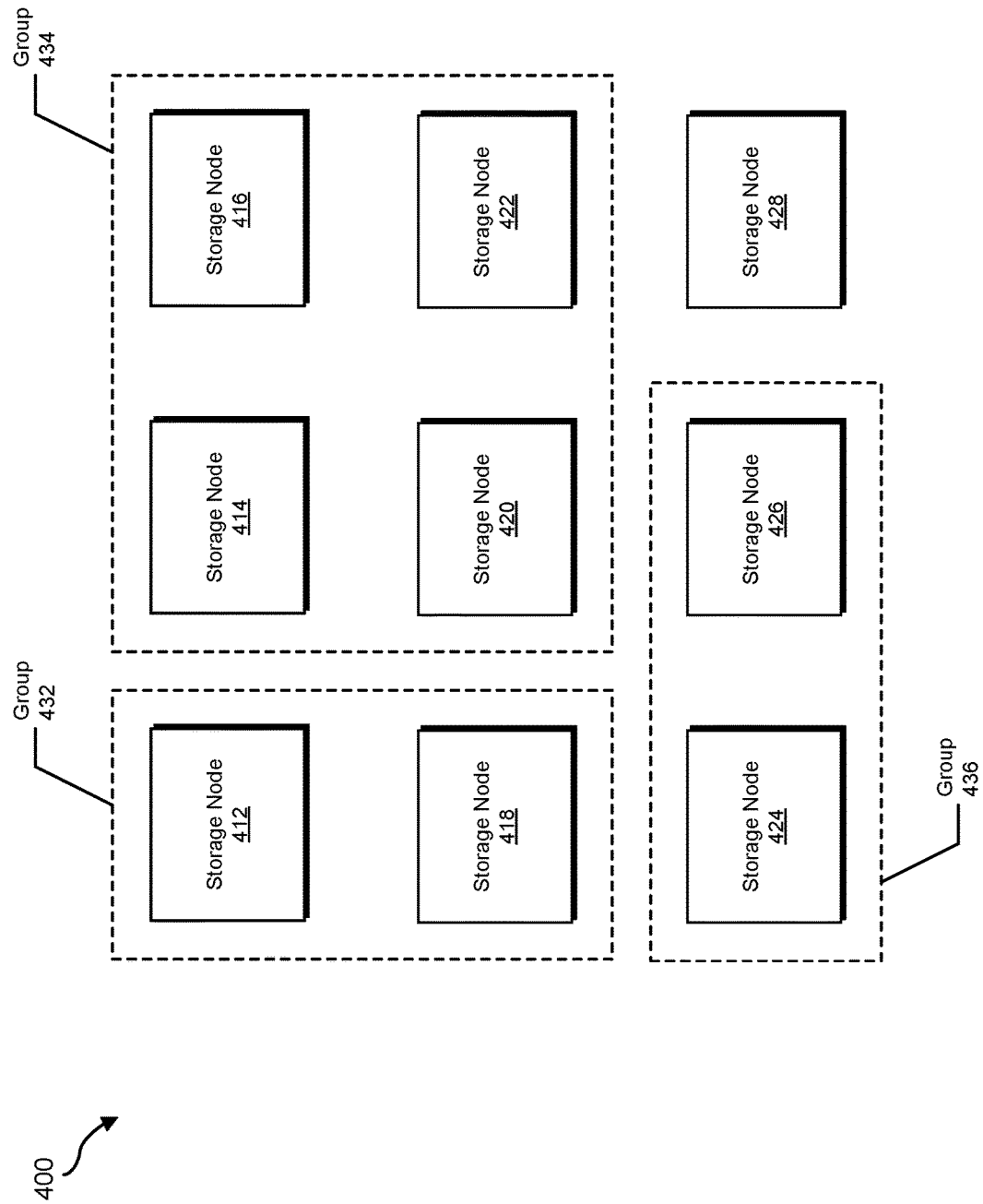
FIG. 4 is a block diagram of an exemplary computing system for backing up large distributed scale-out data systems.

FIG. 4 illustrates an exemplary system 400 for backing up large distributed scale-out data systems. As shown in FIG. 4, exemplary system 400 may include storage nodes 412, 414, 416, 418, 420, 422, 424, 426, and 428 that provide storage for a distributed scale-out data system. In one example, a backup job may apply to data objects stored by storage nodes 412, 414, 416, 418, 420, 422, 424, and 426. Accordingly, one or more of the systems described herein may divide the task of backing up the data objects by grouping the storage nodes and assigning the groups to backup systems. For example, deployment module 108 may define a group 432 that includes storage nodes 412 and 418, a group 434 that includes storage nodes 414, 416, 420, and 422, and a group 436 that includes storage nodes 424 and 426.

Figure 5:
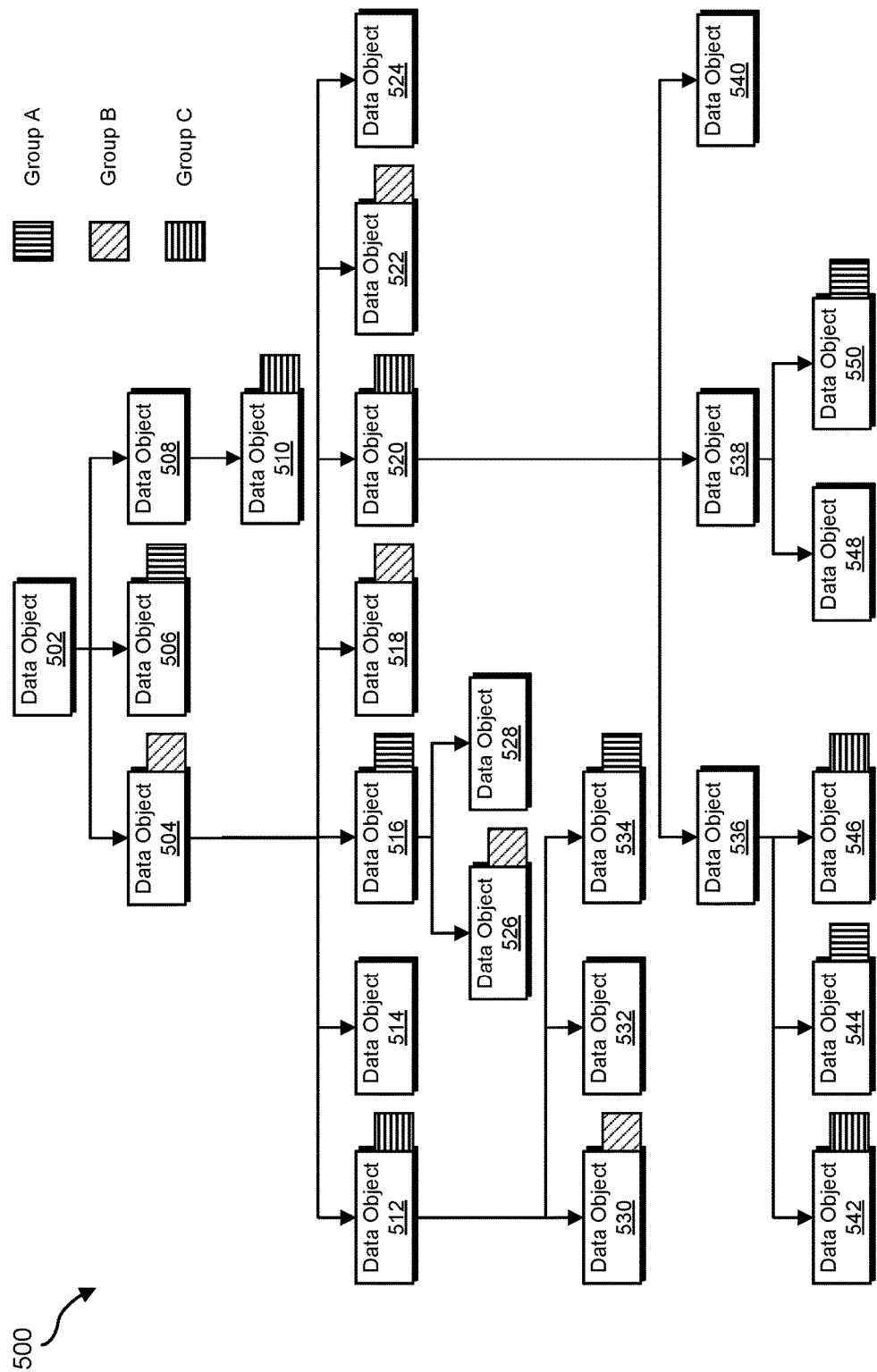
FIG. 5 is a block diagram of an exemplary data storage view for backing up large distributed scale-out data systems.

FIG. 5 illustrates an exemplary storage view 500 of a distributed scale-out data system. As shown in FIG. 5, exemplary storage view 500 may include data objects 502, 504, 506, 508, 510, 512, 514, 516, 518, 520, 522, 524, 526, 528, 530, 532, 534, 536, 538, 540, 542, 544, 546, 548, and 550. In addition, exemplary storage view 500 may also include relations between the data objects. For example, storage view 500 may define parent-child relations between data object 502 and data objects 504, 506, and 508; a parent-child relation between data object 508 and data object 510; parent-child relations between data object 504 and data objects 512, 514, 516, 518, 520, 522, and 524; etc. In one example, the backup job that applies to the distributed scale-out data system may only apply to some of the data objects stored by the distributed scale-out data system (e.g., representing an incremental backup). In one example, deployment module 108 may divide those data objects to be backed up into three groups: Group A, Group B, and Group C (e.g., corresponding to respective groups 432, 434, and 436 in FIG. 4). Thus, data objects 506, 516, 534, 544, and 550 may be backed up by the same backup system; data objects 504, 518, 522, 526, and 530 may be backed up by the same backup system; and data objects 510, 512, 520, 542, and 546 may be backed up by the same backup system.

Returning to FIG. 3, at step 308, one or more of the systems described herein may combine the plurality of backups into a unified backup that represents the unified storage view of the distributed scale-out storage system. For example, combination module 110 may, as part of computing device 202 in FIG. 2, combine backups 240 into unified backup 250 that represents unified storage view 208 of distributed scale-out storage system 206.

Combination module 110 may combine the plurality of backups into the unified backup in any suitable manner. For example, combination module 110 may combine the plurality of backups by storing the plurality of backups in format specified for a single backup by the backup job. Additionally or alternatively, combination module 110 may combine the plurality of backups by storing the plurality of backups under an identifier for the unified backup by the backup job. In some examples, combination module 110 may combine the plurality of backups by storing the plurality of backups in a single storage container.

In some examples, combination module 110 may combine the plurality of backups by integrating the backup data captured by the plurality of backups with metadata describing the data objects. For example, combination module 110 may back up metadata that describes at least one relation between two data objects stored in separate backups within the plurality of backups and may reconstitute the relation between the two data objects in the unified backup. In some examples, combination module 110 may create the unified backup by mapping the data objects stored in the backups to metadata describing the data objects. Additionally or alternatively, combination module 110 may create the unified backup by mapping metadata describing the data objects to the data objects stored in the backups.

Figure 6:
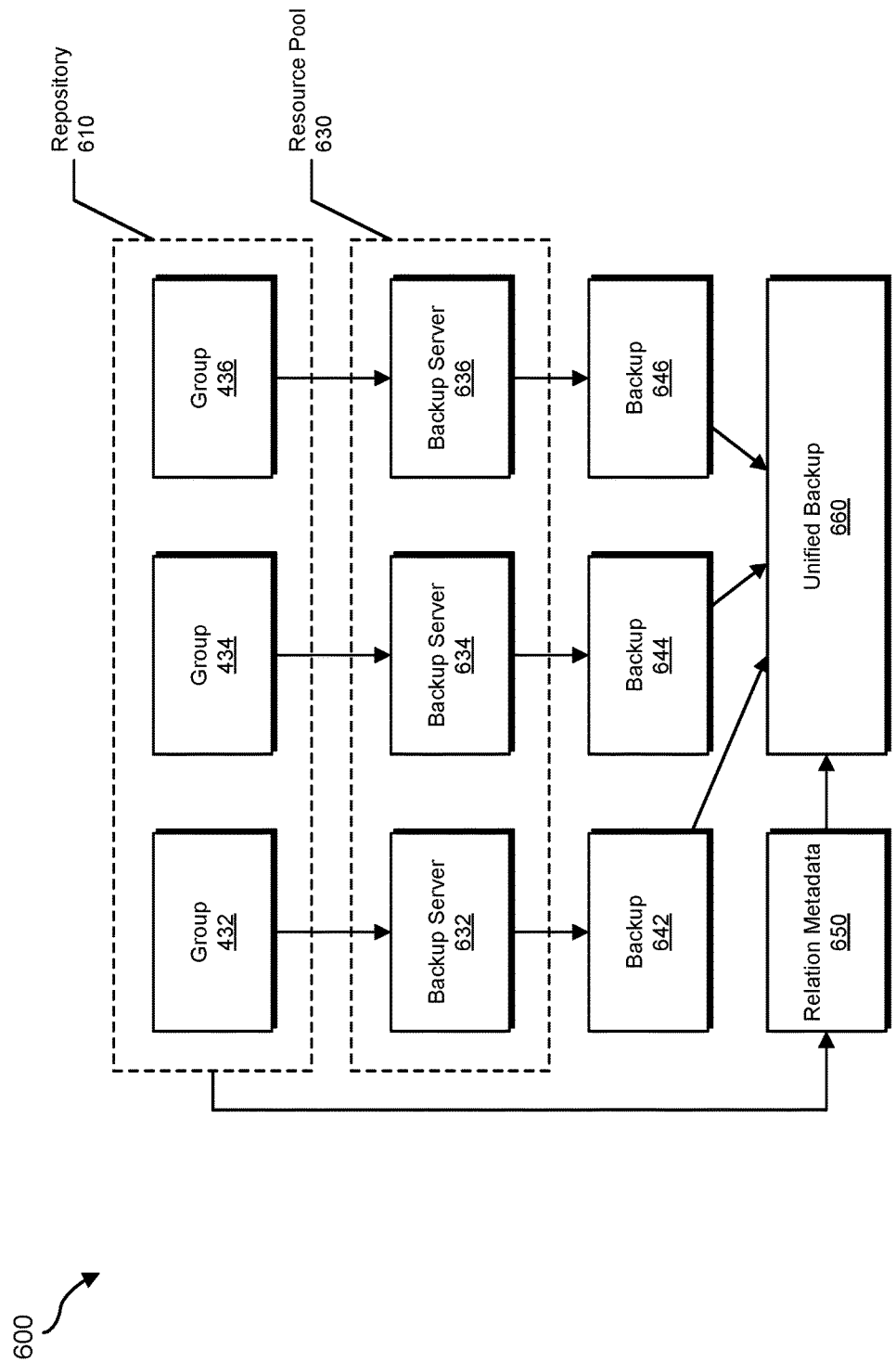
FIG. 6 is a block diagram of an exemplary computing system for backing up large distributed scale-out data systems.

FIG. 6 shows an exemplary system 600 for backing up large distributed scale-out data systems. As shown in FIG. 6, exemplary system 600 may include a repository 610 presented by a distributed scale-out data system. Exemplary system 600 may also include storage nodes, such as groups 432, 434, and 436 illustrated in FIG. 4. In one example, the systems described herein may provision backup servers 632, 634, and 636 from a resource pool 630 and deploy backup servers 632, 634, and 636 to back up data objects within groups 432, 434, and 436, respectively. Backup servers 632, 634, and 636 may thereby create respective backups 642, 644, 646. In addition, one or more of the systems described herein may capture relation metadata 650 from repository 610 (e.g., from the unified storage view provided by the distributed scale-out data systems). Combination module 110 may combine backups 642, 644, and 646, along with relation metadata 650, to generate a unified backup 660.

As explained above in connection with method 300 in FIG. 3, systems described herein may protect large volumes of data stored in distributed scale-out systems (but exposed to clients as a single repository) by breaking down the backup job into independent backups of manageable size which together constitute the backup of the eligible data in the entire large repository. For example, a backup may be configured (e.g., with a selection) that would determine what data is eligible for backup. The systems described herein may (1) interact with the primary storage system (i.e., implemented by a distributed scale-out system) to identify independently stored subsets of the eligible data. Systems described herein may determine where the replicas of eligible data is stored and form independently stored subsets. For example, a million data objects may be eligible for backup; two hundred thousand of these data objects may be stored in one node, and thus be grouped into one subset, and two hundred thousand may be stored in another node, and thus be grouped into another subset.

In some examples, the systems described herein may retrieve information about nodes where data objects and/or replicas are stored from the distributed scale-out system. For example, the systems described herein may access the information through an application programming interface ("API"). Based on the number of independent subsets and the size of the independent subsets, the systems described herein may provision and/or engage a number of backup nodes, each backup node covering one or more independent subsets. Each of the identified backup nodes may perform backups of its own subset (e.g., so as to complete the backup in a manageable time). The systems described herein may use metadata stored along with the backup to identify how the separate backups together constitute the backup of the eligible data in the entire primary storage system. In various examples, the systems described herein may perform the backup to on-premise storage, cloud storage, and/or tape storage.

In some examples, the primary storage system may take a snapshot by coordinating the task across storage nodes. In another example, the primary storage system may take snapshots of subsets of the storage as determined by consistency groups within the entire data set.

By recognizing the distributed scale-out architecture of a primary storage system, and by scaling in accordance with data being protected, the systems described herein may efficiently and effectively perform backups for distributed scale-out storage systems. These systems may achieving backup scaling by breaking a backup job into multiple smaller jobs and stitching the resulting backups together with metadata.

Figure 7:
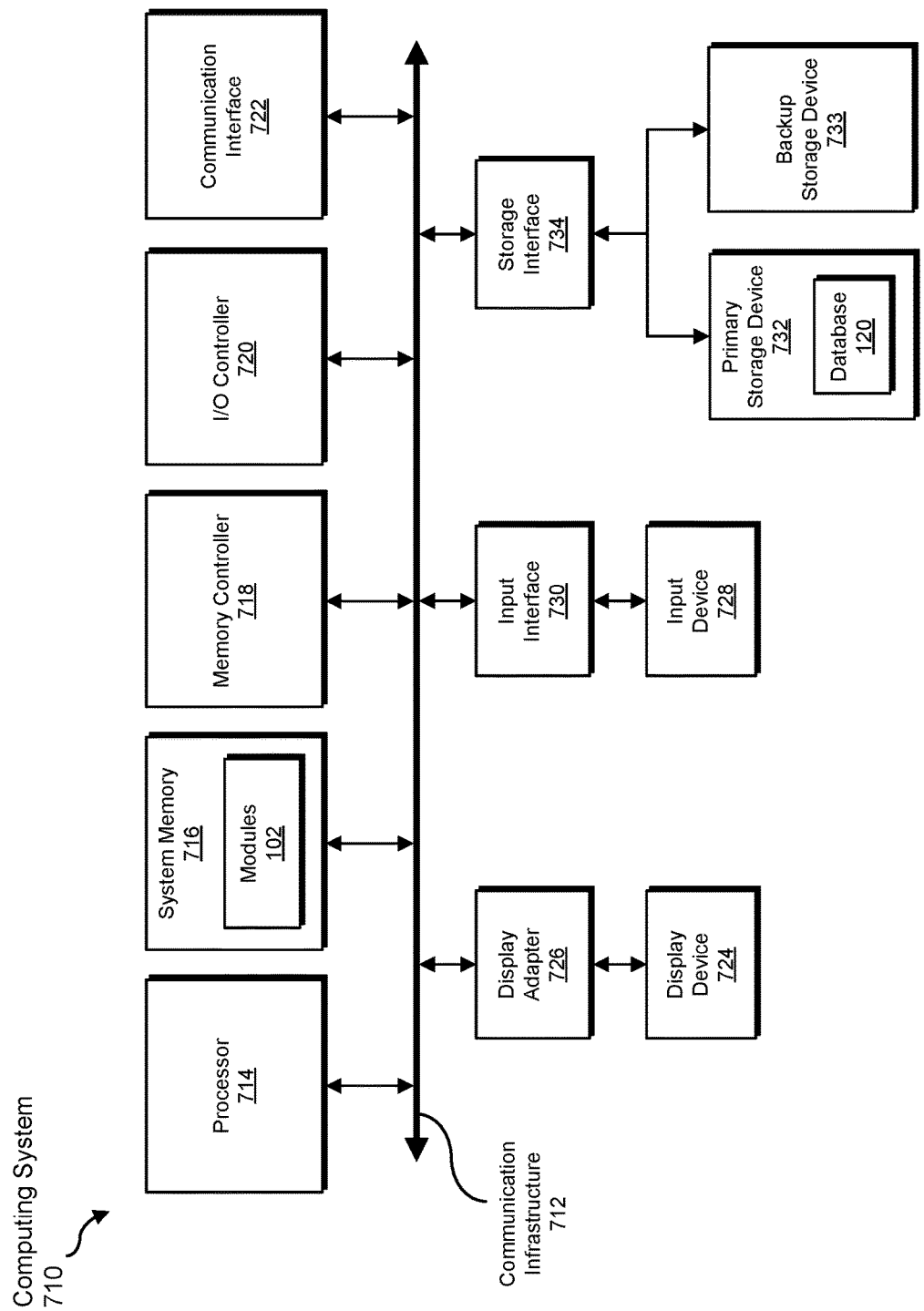
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730.

Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
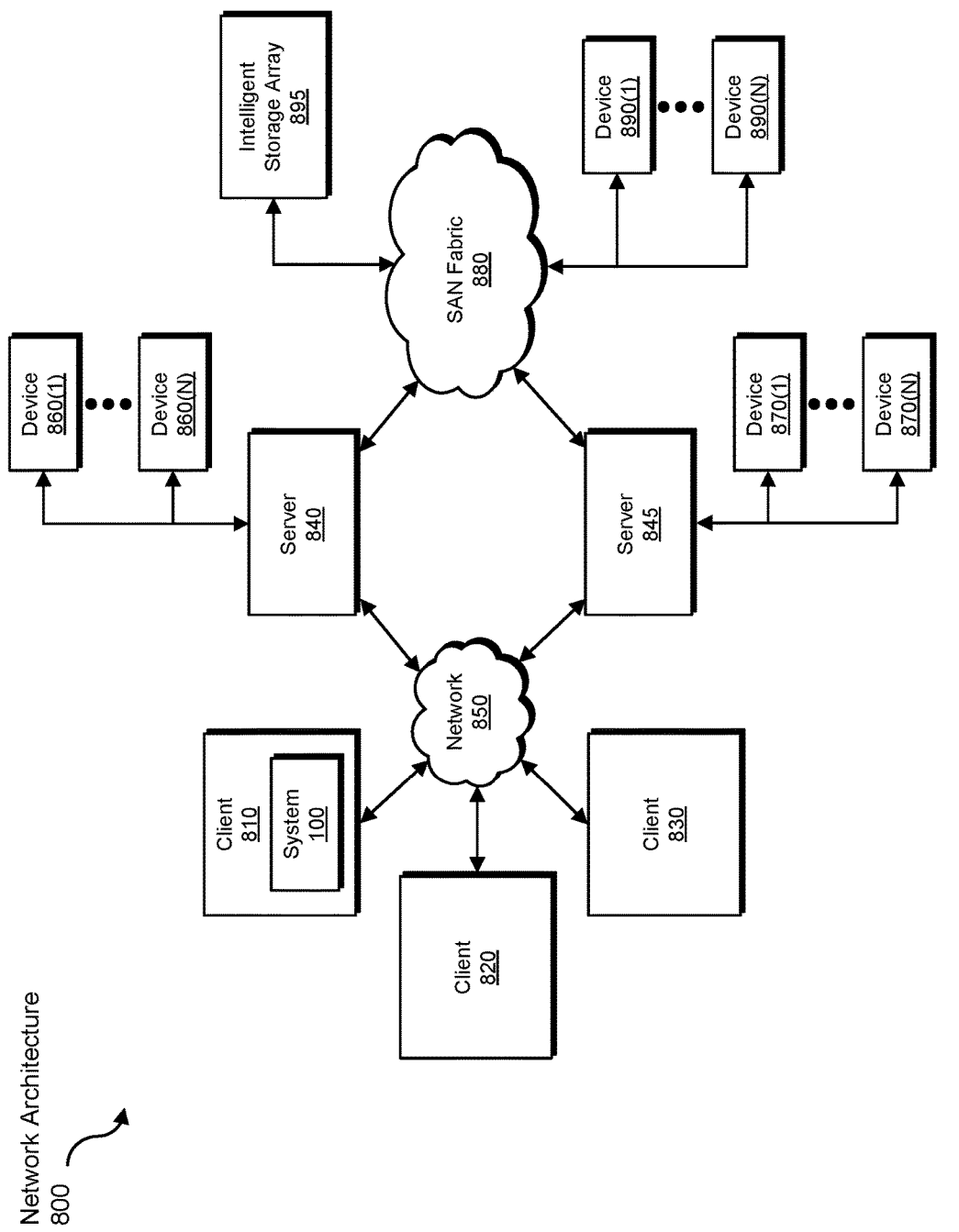
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for backing up large distributed scale-out data systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive stored data to be transformed, transform the stored data into a backup, output a result of the transformation to a storage system, use the result of the transformation to create a unified backup, and store the result of the transformation to a backup storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for backing up large distributed scale-out data systems, at least a portion of the method being performed by a computing device comprising at least one processor, the method comprising:
    identifying a backup job to be performed on a distributed scale-out storage system that presents a unified storage view, the backup job comprising a plurality of data objects, and the distributed scale-out storage system exposing to a client as the unified storage view a single data repository representing multiple underlying storage devices;
    determining, in response to the backup job applying to distributed scale-out storage and based on a scope of the backup job, a number of backup systems to deploy for performing the backup job;
    deploying a plurality of backup systems based on the determined number of backup systems and creating a plurality of backups covering the plurality of data objects by, for each backup system within the plurality of backup systems, (1) assigning, to the backup system, a subset of the plurality of data objects within the backup job to back up and (2) backing up, by the backup system, the subset of the plurality of data objects assigned to the backup system, wherein:
        deploying the plurality of backup systems further comprises dividing the backup job into the plurality of backups corresponding to a plurality of subsets; and
        the backup job is divided such that each subset includes data objects within the backup job that were originally stored on a separate respective storage node of the distributed scale-out storage system at least in part by querying the distributed scale-out storage system for underlying storage locations of data objects identified within the unified storage view; and
    combining the plurality of backups into a unified backup that represents the unified storage view presented by the distributed scale-out storage system.

2. The computer-implemented method of claim 1, wherein creating the plurality of backups comprises creating the plurality of backups in parallel.

3. The computer-implemented method of claim 1, wherein the unified storage view abstracts away individual computing nodes within the distributed scale-out storage system.

4. The computer-implemented method of claim 1, wherein assigning, to the backup system, the subset of the plurality of data objects within the backup job to back up comprises:
    determining that a group of data objects are stored together on the separate respective storage node in the distributed scale-out storage system; and
    including the group of data objects in the subset of the plurality of data objects assigned to the backup system based on the group of data objects being stored together on the separate respective storage node in the distributed scale-out storage system.

5. The computer-implemented method of claim 4, wherein determining that the group of data objects are stored together on the separate respective storage node in the distributed scale-out storage system comprises determining the storage location of each data object within the group of data objects within a view of a distributed architecture of the distributed scale-out storage system rather than determining the storage location of each data object within the group of data objects within the unified storage view.

6. The computer-implemented method of claim 1, wherein combining the plurality of backups into the unified backup that represents the unified storage view of the distributed scale-out storage system comprises:
  backing up metadata that describes at least one relation between two data objects stored in separate backups within the plurality of backups; and
  reconstituting the relation between the two data objects in the unified backup.

7. The computer-implemented method of claim 1, wherein deploying the plurality of backup systems based on the determined number of backup systems comprises dynamically initiating the plurality of backup systems from a pool of computing resources.

8. The computer-implemented method of claim 1, wherein creating the plurality of backups comprises:
  instructing the distributed scale-out storage system to take a snapshot that includes the plurality of data objects; and
  creating the plurality of backups from the snapshot.

9. The computer-implemented method of claim 1, wherein creating the plurality of backups comprises:
  instructing the distributed scale-out storage system to take a plurality of snapshots, each snapshot corresponding to a consistency group of data objects that is configured for point-in-time consistency among data objects within the consistency group; and
  creating the plurality of backups from the plurality of snapshots.

10. The computer-implemented method of claim 1, wherein determining, in response to the backup job applying to distributed scale-out storage, the number of backup systems to deploy for performing the backup job comprises dynamically assessing an amount of computing resources to apply to the backup job rather than assigning a static set of computing resources to apply to the backup job in response to determining that the distributed scale-out storage system represents distributed scale-out storage.

11. A system for backing up large distributed scale-out data systems, the system comprising:
  an identification module, stored in memory, that identifies a backup job to be performed on a distributed scale-out storage system that presents a unified storage view, the backup job comprising a plurality of data objects, and the distributed scale-out storage system exposing to a client as the unified storage view a single data repository representing multiple underlying storage devices;
  a determination module, stored in memory, that determines, in response to the backup job applying to distributed scale-out storage and based on a scope of the backup job, a number of backup systems to deploy for performing the backup job;
  a deployment module, stored in memory, that deploys a plurality of backup systems based on the determined number of backup systems and creates a plurality of backups covering the plurality of data objects by, for each backup system within the plurality of backup systems:
    assigning, to the backup system, a subset of the plurality of data objects within the backup job to back up; and
    backing up, by the backup system, the subset of the plurality of data objects assigned to the backup system, wherein:
    deploying the plurality of backup systems further comprises dividing the backup job into the plurality of backups corresponding to a plurality of subsets; and
    the backup job is divided such that each subset includes data objects within the backup job that were originally stored on a separate respective storage node of the distributed scale-out storage system at least in part by querying the distributed scale-out storage system for underlying storage locations of data objects identified within the unified storage view;
  a combination module, stored in memory, that combines the plurality of backups into a unified backup that represents the unified storage view presented by the distributed scale-out storage system; and
  at least one physical processor configured to execute the identification module, the determination module, the deployment module, and the combination module.

12. The system of claim 11, wherein the deployment module creates the plurality of backups by creating the plurality of backups in parallel.

13. The system of claim 11, wherein the deployment module assigns, to the backup system, the subset of the plurality of data objects within the backup job to back up by determining a number of data objects to include in the subset of the plurality of data objects based on a target proportion of data objects to assign to the backup system.

14. The system of claim 11, wherein the deployment module assigns, to the backup system, the subset of the plurality of data objects within the backup job to back up by:
  determining that a group of data objects are stored together on the separate respective storage node in the distributed scale-out storage system;
  including the group of data objects in the subset of the plurality of data objects assigned to the backup system based on the group of data objects being stored together on the separate respective storage node in the distributed scale-out storage system.

15. The system of claim 14, wherein the deployment module determines that the group of data objects are stored together on the separate respective storage node in the distributed scale-out storage system by determining the storage location of each data object within the group of data objects within a view of a distributed architecture of the distributed scale-out storage system rather than determining the storage location of each data object within the group of data objects within the unified storage view.

16. The system of claim 11, wherein the combination module combines the plurality of backups into the unified backup that represents the unified storage view of the distributed scale-out storage system by:
  backing up metadata that describes at least one relation between two data objects stored in separate backups within the plurality of backups; and
  reconstituting the relation between the two data objects in the unified backup.

17. The system of claim 11, wherein the deployment module deploys the plurality of backup systems based on the determined number of backup systems by dynamically initiating the plurality of backup systems from a pool of computing resources.

18. The system of claim 11, wherein the deployment module creates the plurality of backups by:
  instructing the distributed scale-out storage system to take a snapshot that includes the plurality of data objects; and
  creating the plurality of backups from the snapshot.

19. The system of claim 11, wherein the deployment module creates the plurality of backups by:
  instructing the distributed scale-out storage system to take a plurality of snapshots, each snapshot corresponding to a consistency group of data objects that is configured for point-in-time consistency among data objects within the consistency group; and creating the plurality of backups from the plurality of snapshots.

20. A non-transitory computer-readable medium comprising one or more computer-readable instructions that, when executed by at least one processor of a computing device, cause the computing device to:

identify a backup job to be performed on a distributed scale-out storage system that presents a unified storage view, the backup job comprising a plurality of data objects, and the distributed scale-out storage system exposing to a client as the unified storage view a single data repository representing multiple underlying storage devices;

determine, in response to the backup job applying to distributed scale-out storage and based on a scope of the backup job, a number of backup systems to deploy for performing the backup job;

deploy a plurality of backup systems based on the determined number of backup systems and creating a plurality of backups covering the plurality of data objects by, for each backup system within the plurality of backup systems:

assigning, to the backup system, a subset of the plurality of data objects within the backup job to back up; and backing up, by the backup system, the subset of the plurality of data objects assigned to the backup system, wherein:

deploying the plurality of backup systems further comprises dividing the backup job into the plurality of backups corresponding to a plurality of subsets; and the backup job is divided such that each subset includes data objects within the backup job that were originally stored on a separate respective storage node of the distributed scale-out storage system at least in part by querying the distributed scale-out storage system for underlying storage locations of data objects identified within the unified storage view; and combine the plurality of backups into a unified backup that represents the unified storage view presented by the distributed scale-out storage system.

* * * * *